United States Patent [19]
Flood et al.

[11] Patent Number: 5,563,612
[45] Date of Patent: Oct. 8, 1996

[54] FREQUENCY MULTIPLIER CIRCUITRY FOR RADIO BEACONS

[76] Inventors: John F. Flood, 800 E. Tropical Way, Plantation, Fla. 33317; Richard C. Havens, 9734 NW. 7th Cir., Apt. 6-28, Plantation, Fla. 33324

[21] Appl. No.: 382,863

[22] Filed: Feb. 3, 1995

[51] Int. Cl.[6] .................................................. G01S 1/00
[52] U.S. Cl. .................................................. 342/385; 331/53
[58] Field of Search .................. 342/385; 331/49, 331/53; 455/59

[56] References Cited

U.S. PATENT DOCUMENTS

| | | |
|---|---|---|
| 4,101,894 | 7/1978 | Warner et al. |
| 4,673,936 | 6/1987 | Kotoh ........................... 342/51 |
| 4,754,236 | 6/1988 | Mamodaly et al. .......... 331/117 FE |
| 5,138,284 | 8/1992 | Yabuki et al. ..................... 331/56 |
| 5,200,713 | 4/1993 | Grace et al. ....................... 331/49 |

*Primary Examiner*—Theodore M. Blum
*Attorney, Agent, or Firm*—Malin, Haley, DiMaggio & Crosby, PA

[57] ABSTRACT

A portable emergency position indicating radio beacon (EPIRB) that transmits two signals at different frequencies whereby one frequency is twice the frequency of the other and wherein the beacon incorporates a push-push frequency multiplier to multiply the generated signal and to cancel odd and higher order even harmonics in the multiplied signal so as to improve efficiency, decrease power dissipation, improve the circuit quality factor, and decrease wave distortion. The improved frequency doubling circuitry allows for an EPIRB of reduced housing volumetric size and reduced battery size without reducing signal output power.

14 Claims, 4 Drawing Sheets

FREQUENCY MULTIPLIER CIRCUITRY FOR RADIO BEACONS

BACKGROUND OF THE INVENTION

1. Field of the Invention

This invention relates to emergency position indicating radio beacons (EPIRBs) which are used in search and rescue to locate people, such as those lost at sea, shipwrecked, or stranded in the wilderness, through the transmission of radio signals and information on two different guard channel frequencies, one frequency being double the frequency of the other, and in particular, to a radio beacon that transmits RF information at two guard frequencies generated by improved frequency multiplier circuitry resulting in a more compact housing with higher signal gain, improved efficiency, decreased distortion, and decreased power dissipation, allowing for operation with less batteries.

2. Description of the Prior Art

Emergency position indicating radio beacons (EPIRBs) are used by people who are shipwrecked, lost, or stranded at sea for transmitting distress information signals at frequencies monitored on guard channels by the Coast Guard and other search and rescue forces. An EPIRB is a small, portable, battery-powered RF transmitter having precoded messages of emergency identification that is stored in an emergency equipment environment such as a raft, aboard large ships or aircraft, activated usually manually or possibly by contact with water. Volumetric size and weight are very important factors in the effective storage of EPIRBs when not in use. Storage design is balanced against RF signal output power and strength for effective signal radiation and transmission, a critical design factor. The transmitted signal allows rescue teams to locate and home in on a lost boater or pilot's position. Guard or RF emergency channels are monitored radio frequencies of 121.5 MHz and 243.0 MHz so as to receive distress calls in the form of swept audio tones or pulsed Mayday, S.O.S. and other emergency data. The frequency, 121.5 MHz, was the original channel that distress signals were first transmitted and received on, while 243.0 MHz has become more popular because of its increased range, antenna efficiency and usage by the military. Although equipment exists which operates at both frequencies, older models still in use receive distress calls only at 121.5 MHz. Accordingly, contemporary EPIRBs are being designed to transmit at both guard channel frequencies so as to more effectively communicate with entities such as the U.S. Coast Guard ships and facilities, rescue planes and ships at sea.

In order to transmit two distinct RF frequencies from a single EPIRB, dual frequency radio beacons known in the art typically generate a first single frequency at 121.5 MHZ which is doubled in a conventional frequency doubling channel multiplier to produce the other signal at 243.0 MHz. The first generated signal is fed on one branch into the doubling multiplier and also to a different branch that bypasses the multiplier so that both output signals, 121.5 MHz and 243 MHz, may be broadcast by a combining network. However, the conventional frequency multiplier employed in these radio beacons generate undesired harmonics of increasing order in a Fourier series, causing unwanted power dissipation and wave distortion. For a particular power output, a large number of batteries is required and hence, EPIRB housing size has been larger than desired. The EPIRB should be lightweight and take up as little space as possible without sacrificing power output.

The frequency multipliers employed in the past include non-linear amplifiers which generate harmonics in their output and have a tuned load that resonates at one of the harmonics, and diode multipliers. The non-linear harmonic generating amplifier doubles frequency by driving the input of two transistors with opposite polarities usually obtained from opposite ends of a transformer or tank circuit. The problem with the harmonic generating amplifier, however, is that the output produces the higher order harmonics including odd harmonics which tend to dissipate power and decrease gain. Meanwhile, the diode multipliers also realize power loss, in the order of 6 db, and the input may be as much as four times the output. In addition, the efficiency of the diode multiplier is relatively low.

In short, both type EPIRB frequency doublers circuitry necessitate larger power supplies to satisfy increased power requirements because of the power dissipation, wave distortion and low efficiency caused by the presence of odd harmonics. This makes the beacons heavier and more expensive to operate. Moreover, since it is often the case that lost or stranded personnel are unsure of when their rescue will be made or since days may lapse before a group is discovered, the problem of power dissipation could be detrimental. A beacon which uses half the power of conventional beacons would significantly decrease the battery drain, require smaller battery packs and allow additional or spare batteries to be carried. Consequently, there exist a need for a radio beacon with a more efficient frequency multiplier capable of reducing the power requirements, increasing the Q factor of the circuit and improving the overall gain.

The present invention solves the problems discussed above by providing a radio beacon with a frequency doubler circuit that is able to suppress extraneous odd RF signal harmonics and inherently rectify the signal to increase the quality factor of the circuit and minimize the power dissipation of the battery source so that only half the conventional battery size is required to achieve the required power output. The present invention accomplishes these goals by incorporating a push-push amplifier circuit that utilizes two base grounded transistors with a high Q input phase splitter that is able to multiply the incoming source signal while eliminating the odd harmonics of the signal to minimize power dissipation.

SUMMARY OF THE INVENTION

An emergency position indicating radio beacon for transmitting RF signals at two discrete frequencies, typically 121.5 MHz and 243 MHz, comprising a waterproof housing, an RF antenna connected to the housing for transmitting the RF signals, a power supply such as two C-type cell batteries mounted inside the housing, an oscillator signal generating circuit for generating a predetermined RF signal, typically 121.5 MHz, a push-push frequency amplifier (or multiplier) that eliminates the odd harmonics of the input signals and generates a signal having double the frequency which is not rich in RF harmonics so that a clean signal is transmitted, a tank circuit connected across the push-push amplifier input having a low reactance for achieving a high quality factor, Q, and a circuit which receives both 121.5 MHz signals and 243 MHz signals for transmission out the antenna.

The dual frequency radio beacon is a distress signal device that generates two widely known and used distress signals at different frequencies. One frequency is transmitted at 121.5 MHz, and the other is transmitted at 243 MHz, or twice the first frequency. The invention comprises a power supply circuit, a function generating circuit, a push-push frequency multiplier, a tank circuit, a dual frequency receiver circuit and an RF antenna. It has been determined that a more efficient frequency multiplier with a tank circuit can significantly decrease the power drain and thereby reduce the power supply requirements. Therefore, the present invention has been designed to be more efficient than conventional beacons decreasing the power drain by fifty percent (50%). Prior to the invention four C-type batteries were required whereas only two "C" batteries are now required without a power output reduction in output radiated signal strength. The function generating circuit utilizes one oscillator, such as a crystal quartz oscillator to generate the 121.5 MHz signal. The 121.5 MHz signal is then doubled in frequency by transmitting it into the frequency multiplier or doubler circuit. The 121.5 MHz signal is also set by a separate branch circuit bypassing the multiplier at the junction of the input to the multiplier and then controlled by a timing circuit simultaneously with the 243 MHz so as to combine the antenna radiation transmission of the two signals. Typically, the output signals are amplitude modulated so that they are received on an AM receiver.

The essence of the present invention is to reduce the battery size necessary so as to reduce the weight and size of the dual frequency radio beacon so that space and weight are conserved without jeopardizing transmission signal power. The present invention accomplishes these goals by providing a frequency doubler circuit with high efficiency and gain.

The frequency doubler generally comprises a push-push amplifier that not only provides a higher Q factor but a greater efficiency and range of operating power level over conventional frequency multipliers. Generally, when sinusoidal signals are multiplied, a Fourier series is created with odd and even, higher frequency harmonics which reduce efficiency and dissipate power. The present multiplier negates the odd harmonics and the fundamental frequency. The push-push amplifier accomplishes this increased efficiency by using two bi-polar transistors which are essentially connected in parallel except for the presence of a tank circuit between the transistor emitters. The collectors of the transistors are connected together while the base of both transistors are grounded. The bases run to ground to allow increased efficiency over a greater range of input power level. Normally, when the power levels are too high or too low, efficiency drops off; however, by running the transistor bases to ground with a high Q input network the power output level and efficiency are stabilized.

A phase shift occurs at the input of the frequency doubler circuit to generate two signals 180° out of phase. The net effect is that each peak of the input signal is inherently rectified and used to create two outputs per cycle resulting in a doubling of the frequency. This is similar to the positive and negative inputs in push-pull amplifiers which yield a common output. By contrast, however, the placement of two transistors in a push-push configuration results in the cancellation of the fundamental frequency and odd and higher order even harmonics which are normally responsible for the dissipation of power. In addition, the result is a more efficient multiplier with at least unity gain or higher and a frequency multiplier that produces a clean sinusoidal output signal having twice the original frequency, i.e. 243 MHz.

The quality factor, or Q, of the circuit is important for signal clarity, narrow conduction angles, and more efficient operation of the frequency doubler circuit so as to minimize power dissipation and wave distortion. The push-push frequency doubler, therefore, demands a high Q-factor input network to achieve a high efficiency multiplier. Accordingly, a tank circuit is coupled to the emitters of the multiplier to effect a high Q-factor. A high Q is accomplished in the circuit by incorporating low reactance with respect to the circuit load impedance presented by the emitters. Since, reactance is proportional to inductance and inversely proportional to capacitance, small inductance and large capacitance are required to achieve the necessary high Q.

The frequency generating circuit produces the input signal which is doubled and conditioned by the multiplier. It primarily includes a 121.5 MHz crystal oscillator and an amplifier. The output of the amplifier is fed into a splitter circuit which provides two outputs at the original frequency, that is 121.5 MHZ. One output is tied directly to the frequency doubler input while the second output bypasses the frequency doubler. Both the 243 MHz signal generated by the frequency doubler and the 121.5 MHz signal are further controlled by the timing/switching circuit. Consequently, two signals are generated and transmitted.

Diodes provide gates which either allow or disallow passage of the signals to the antennas. The modulation sequence or timing of the diode gates is controlled by the switching circuit which includes a PIC16C54 IC, a 3.57 MHz crystal oscillator and a timing pulse.

Power is supplied to the entire beacon circuit by two C-type direct current batteries. In prior art EPIRBs, typically, four C-type batteries were needed to compensate for power dissipation, wave distortion and a low quality factor, Q to provide dual frequency RF output signals of a predetermined power level. However, because of the push-push frequency multiplier and the tank circuit the efficiency, quality factor and gain of the circuit have been increased resulting in lower power dissipation and wave distortion. Accordingly, the power supply requirements have been reduced by substantially fifty percent (50%). This affords smaller, more compact and less costly designs.

The output power of the multiplier signals may be between a few milliwatts to a few hundred milliwatts. Nonetheless, the frequency doubler circuit is operational with high powered signals as well. But normally, since some power dissipation does occur it is preferred that this power loss occur at the lower level signals to minimize the loss. Afterwards, the signal is amplified for transmission.

It is an object of the present invention to provide a dual frequency RF transmitter beacon with improved power efficiency so that the power supply requirements are reduced without reduction in transmitter signal power.

It is another object of the invention to provide a dual frequency radio beacon that only requires a single oscillator but transmits two signals with improved clarity.

It is a further object of the invention to provide a dual frequency radio beacon transmitter having a frequency multiplier with higher efficiency and a high circuit quality factor, Q, to reduce power dissipation and to improve signal clarity.

It is also an object of the invention to provide a dual frequency radio beacon having a frequency multiplier that eliminates the fundamental frequency and odd and higher order even harmonics in its signals for improved efficiency.

It is yet another object of the instant invention to provide a dual frequency radio beacon that floats.

In accordance with these and other objects which will become apparent hereinafter, the instant invention will now be described with particular reference to the accompanying drawings.

DESCRIPTION OF THE PREFERRED EMBODIMENTS

Figure 1:
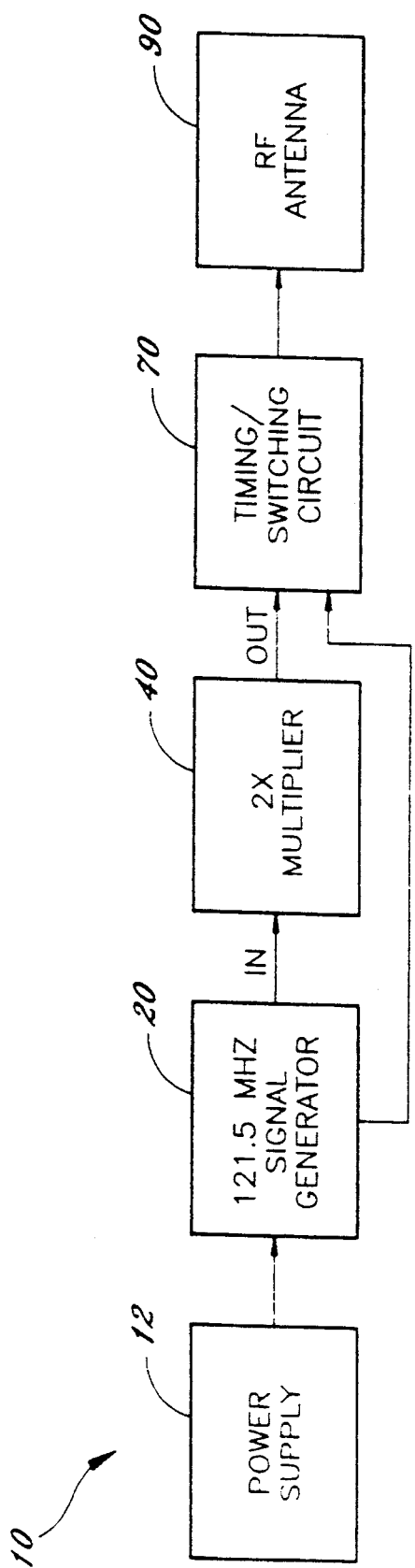
FIG. 1 is an electrical block diagram of the preferred embodiment of the dual frequency radio beacon.

With reference to the drawings, FIGS. 1–5 depict the preferred embodiment of the dual frequency radio beacon characterized by the reference numeral 10. The dual frequency emergency position indicating radio beacon 10 transmits RF signals at predetermined frequencies, typically 121.5 MHz and 243 MHz and comprises a waterproof housing 11 (FIG. 5), an RF antenna 90 connected to the housing 11 for transmitting the RF signals, a power supply 12, a signal generating circuit 20 for generating a predetermined RF signal, typically 121.5 MHz, a push-push frequency amplifier (or multiplier) 40 that eliminates the odd harmonics of the multiplied signals so that a clean signal at twice the input frequency is transmitted, a tank circuit connected across the push-push amplifier for achieving a high quality factor Q, and a timing circuit 70 which simultaneously outputs signals at 121.5 MHz and 243 MHz for transmission out the antenna 90.

FIG. 1 represents a block diagram of the instant invention 10, illustrating the power supply circuit 12, the signal or function generating circuit 20, the push-push frequency multiplier 40, the timing/switching circuit 70, and the RF antenna circuit 90. The power supply 12 of the present invention preferably utilizes two C cell batteries of the lithium anode type which produce 3 volts each or 6 volts DC. At least four "C" cell batteries were used in the prior art to achieve the same RF output power, but because of improved efficiency in the multiplier, the power supply has been reduced by fifty percent. The power supply circuit 12 provides power to the entire beacon for transmitting the dual signals.

Figure 2:
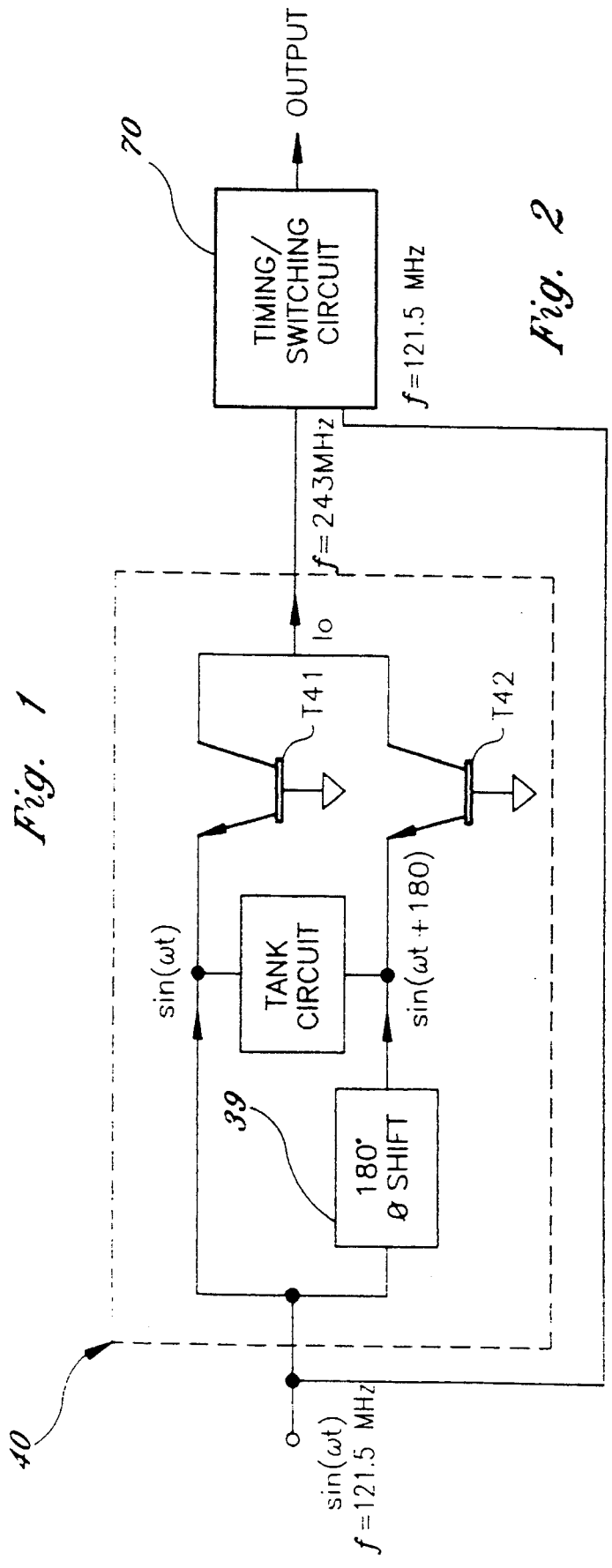
FIG. 2 is a partial electrical schematic diagram of the preferred embodiment of the instant invention illustrating a simplified version of the frequency multiplier, tank circuit, and switching circuit to show basic operation.
Figure 3:
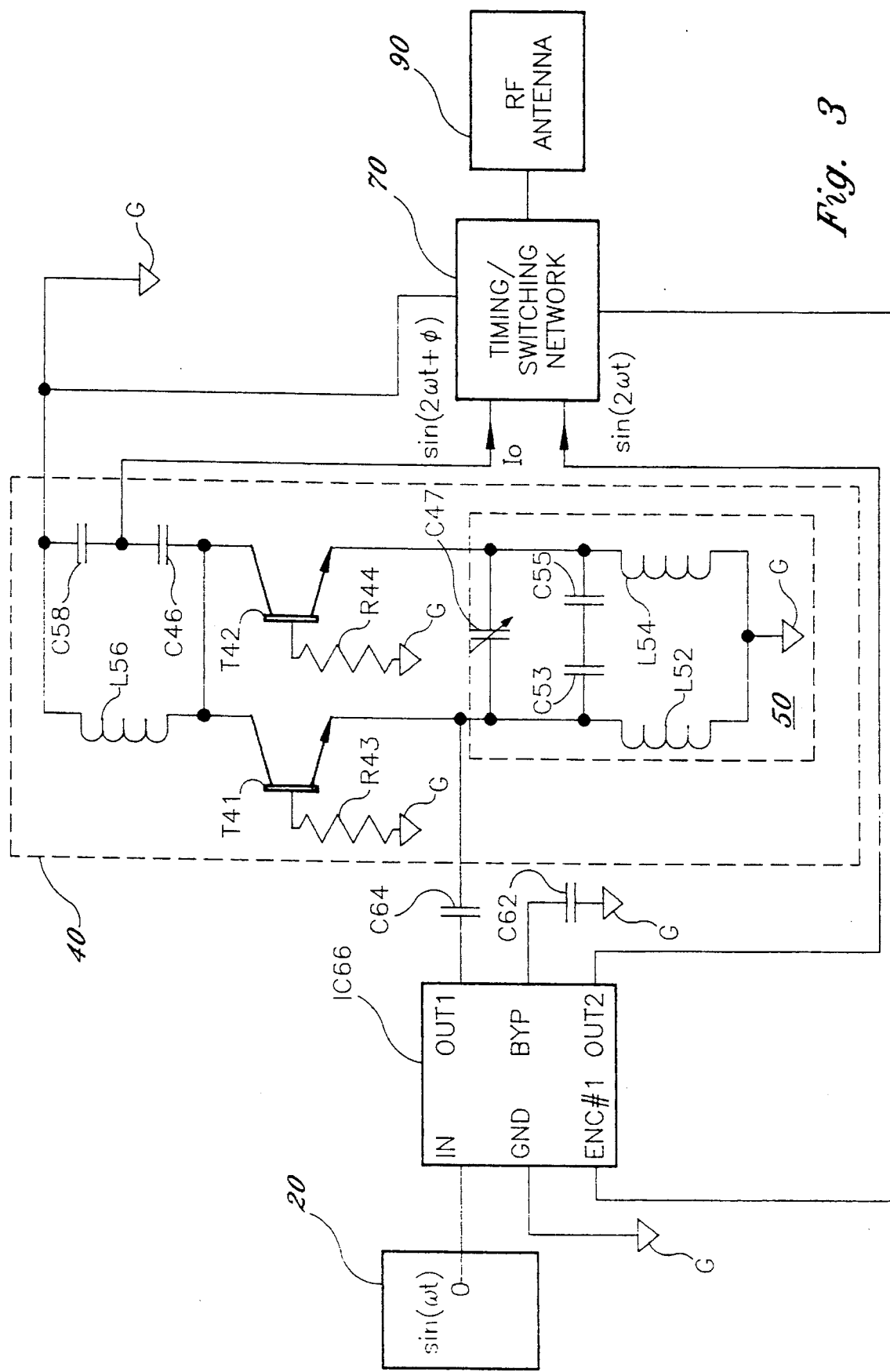
FIG. 3 is an electrical schematic diagram of the frequency multiplier illustrating its operation with the switching circuit and signal switch which are shown in block form.
Figure 4:
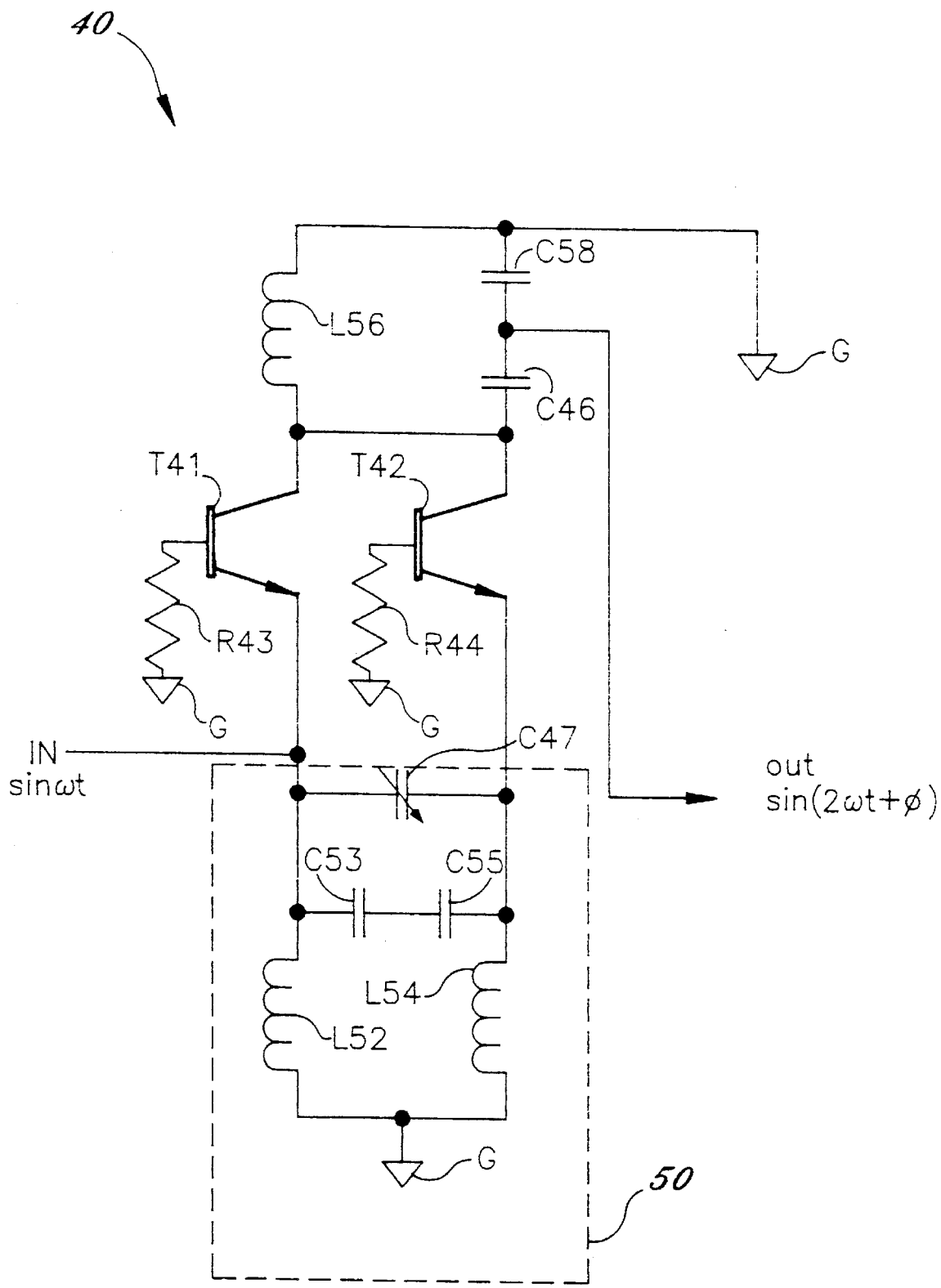
FIG. 4 is an electrical schematic diagram of the multiplier.
Figure 5:
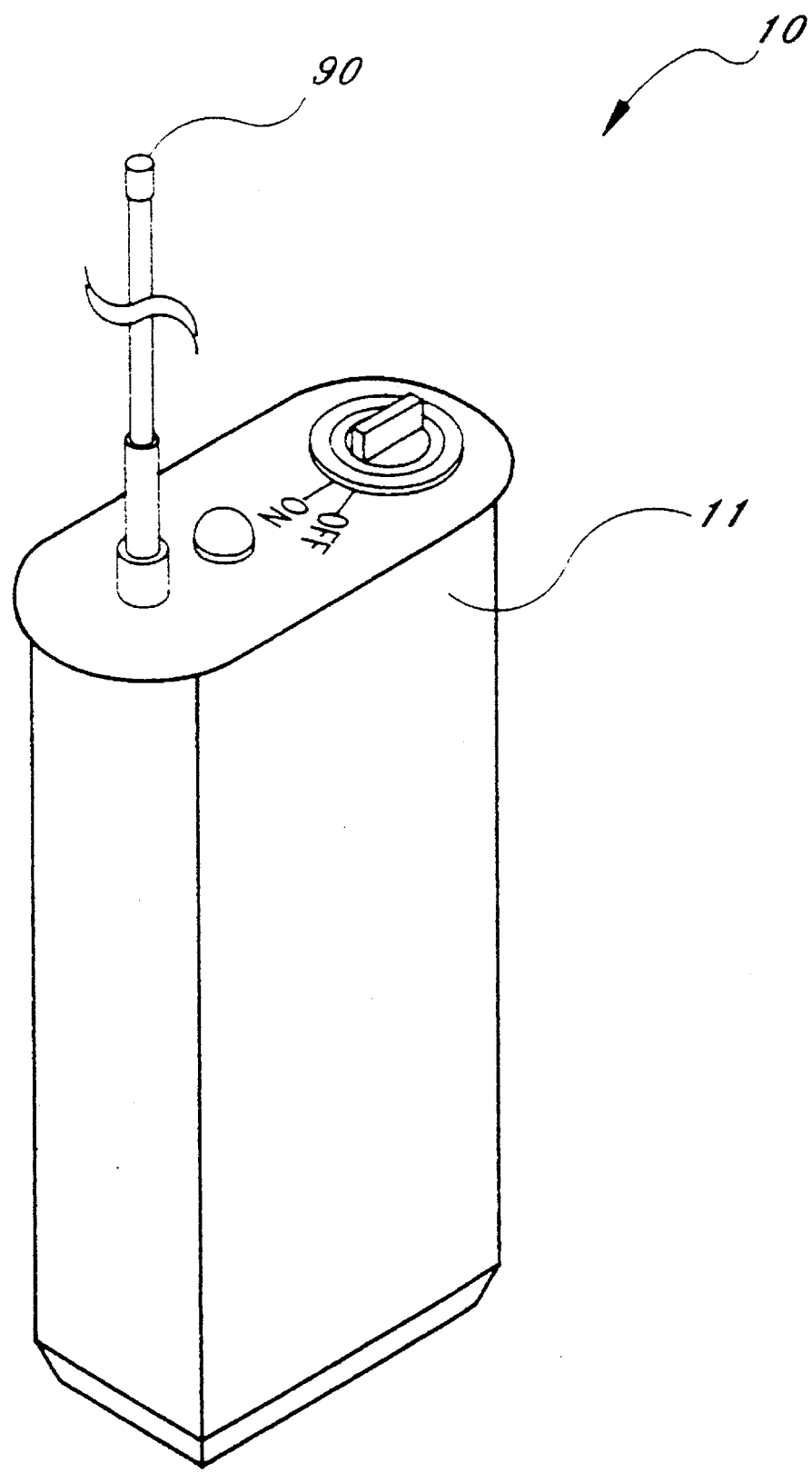
FIG. 5 is a perspective view of the housing of the instant invention.

The function generating circuit 20 generally comprises a crystal oscillator that generates a 121.5 MHz sinusoidal signal which provides an input to the frequency doubler or multiplier 40 on one leg and an input to the switching circuit 70 on another leg, as seen in the block diagram and FIG. 4. The function generating circuit 20 also includes an amplifier which amplifies the signal transmission through the multiplying circuit 40. In FIG. 3, electrically interposed between the multiplying circuit 40 and the signal generating circuit 20 is a splitter integrated circuit IC66, which may be of a switching type, that conveys the generated signal into the multiplying circuit on one leg, while bypassing the signal to the timing circuit 70 on the other leg. The multiplier 40 comprises a frequency doubler utilizing two active devices, T41 and T42, operating in push-push so that it is possible to supply a signal with the required amount of power and twice the frequency with a conversion efficiency in the eighty percent range. The frequency doubler cancels the odd harmonics which are normally generated in a multiplier so as to minimize power dissipation and rectification angles to improve the overall efficiency of the circuit. The multiplier 40 also includes a phase inversion tank circuit 50 with a 180° phase shifter 39 (FIG. 2). The tank circuit 50 is connected across the active devices to provide an extremely high level Q factor. A high level Q factor is extremely important for signal clarity and circuit efficiency, and helps to minimize wave distortion. The tank circuit 50 provides a low reactance for achieving the high Q in the circuit. Meanwhile, the 180° phase shifter shifts the input signal 180° for passing through a first active device, or bipolar transistor T42 while the input signal also passes through a second bipolar transistor T41 without a phase shift. Accordingly, the frequency doubler circuit 40 generates two signals 180° out of phase and outputs the two signals in phase. This operation is analogous to a positive and negative input into push-pull amplifier circuits which also produce a common output. However, the push-push amplifier 40 used in the multiplier 40 cancels odd harmonics so that a clean signal is produced. The net effect of multiplying the two out of phase signals is to use each peak to create two outputs per cycle so that a signal having twice the frequency is produced. Also shown in FIG. 2 is the RF grounding of the base of transistor T42 and the base of transistor T41. Connecting the grounded base transistors' emitters across the high-Q tank circuit results in narrow conduction angle for the transistors, resulting in higher circuit efficiency over a wide range of input power level. The net effect of the multiplier 40, thus, is to eliminate odd harmonics, increase the quality factor Q, and increase the efficiency of the circuit, resulting in reduced power requirement.

As illustrated in FIGS. 1–3, both the signal generated from the frequency generating circuit 20 and the output signal from the frequency doubler 40 are fed into the timing/switching circuit 70. The 121.5 MHz sinusoidal signal generated by the frequency generating circuit 20 is doubled into a 243 MHz sinusoidal signal by the frequency doubler and both are tied to the input of the switching circuit 70. The timing/switching circuit 70 switches the 121.5 and 243 MHz signals so that the signals are transmitted through the RF antenna 90. This allows the beacon to communicate with receivers tuned to one or both frequencies. The RF antenna 90 is coupled directly to the switching circuit 70.

With reference to FIG. 4, the frequency doubler 40 generally comprises a push-push amplifier connection wherein transistors T41 and T42 are essentially connected in parallel. That is, the collectors of T41 and T42 are directly connected, while the emitters of T41 and T42 are electrically joined by a tank circuit 50 including adjustable capacitor C47. Capacitor C47 helps to tune the multiplying circuit T40. Both the bases of T41 and T42 are connected to ground by grounding resistors R43 and R44, respectively. Grounding the transistors' bases increases efficiency over a greater power range. By grounding the bases of T41 and T42, the frequency multiplier 40 has a more predictable output, whereby it essentially operates like a diode, but with improved efficiency, to provide a broader input range for a wide range of input power, and for greater circuit tolerance. In addition, diode multipliers realize greater power loss and less efficiency. Accordingly, grounding the transistors T41 and T42 provides a more efficient frequency doubler or multiplier 40 than conventional diode multipliers.

A tank circuit 50 is also coupled across the emitters of T41 and T42 to improve the Q factor of the multiplier 40. The tank circuit 50 includes capacitor C47 in parallel with capacitors C53 and C55 connected in series with inductors L52 and L54, providing shunts to ground G. The tank circuit provides a low reactance so that a high Q may be achieved to improve the efficiency of the circuit. A high Q is essential for achieving the proper efficiency so that signals having greater clarity may be transmitted.

By improving the power efficiency of the frequency doubling circuit, the physical size of the improved EPIRB is reduced to almost one half when compared to prior art EPIRBs with no reduction in dual signal transmission strength.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A dual frequency emergency position indicating radio beacon, said radio beacon comprising:

a housing;

an electrical power supply mounted within said housing for providing power to said radio beacon;

circuit means mounted inside said housing for generating a first signal at a first predetermined radio frequency for broadcast;

a push-push amplifier including two active devices with their bases connected to RF ground, said push-push amplifier connected to said circuit means for multiplying said first frequency of said first signal to generate a second signal double in frequency of said first signal;

an antenna connected to said housing exterior and electrically connected to said circuit means and said push-push amplifier for broadcasting and transmitting said first and second signals from said antenna as a radio beacon; and a switch electrically connected to said power supply for connecting said power supply to said circuit means.

2. An emergency position indicating radio beacon for transmitting two signals at two frequencies wherein one frequency is a multiple of the other frequency, said radio beacon comprising:

a housing;

means for providing power mounted within said housing for providing power to said radio beacon;

means for generating a first radio frequency signal for broadcast at a first frequency, said means for generating a radio frequency signal electrically coupled to said power means within said housing;

means for multiplying the first frequency of the first radio frequency signal to produce a second radio frequency signal having twice the frequency as the first radio frequency signal, said means for multiplying including a means for cancelling odd harmonics of said first and second signals, said means for multiplying being electrically associated with said means for generating so as to receive said first signal;

means for transmitting said first signal and said second signal such that said first and second signals are transmitted for a predetermined period, said means for transmitting being electrically coupled to said means for generating and to said means for multiplying so as to receive said first signal and said second signal; and an antenna connected to said housing and electrically connected to said means for transmitting so as to broadcast said first and second signals from said antenna as a radio beacon.

3. A radio beacon as recited in claim 2, wherein said means for providing power comprises a lithium anode C-cell battery pack that produces substantially six D.C. volts.

4. A radio beacon as recited in claim 2, wherein said means for generating a first radio frequency signal comprises:

a crystal oscillator for generating the first signal with substantially sinusoidal oscillation; and an amplifier electrically connected to said crystal oscillator for amplifying the first signal generated by said crystal oscillator.

5. A radio beacon as recited in claim 2, wherein said means for multiplying comprises:

a push-push amplifier including two active transistor devices each having bases connected to RF ground, said push-push amplifier connected to said first signal generating means for multiplying said first frequency of said first signal to generate the second signal.

6. A radio beacon as recited in claim 5, wherein said means for transmitting comprises:

a first switch diode electrically associated with said means for generating a first radio frequency signal for receiving said first signal and for transferring to said antenna; and a second switch diode electrically associated with said push-push amplifier for receiving said second signal and for transferring to said antenna.

7. A dual frequency emergency position indicating radio beacon, said radio beacon comprising:

a function generating circuit for generating a first signal at a predetermined first radio frequency;

a frequency doubler circuit for increasing the first radio frequency of the first signal by a multiplying factor to produce a second signal having a second radio frequency double the first radio frequency, said frequency doubler being electrically connected to said function generating circuit for receiving the first signal to produce the second signal;

a tank circuit electrically connected to said frequency doubler circuit for increasing the efficiency of said doubler circuit;

a timing circuit for controlling the period of transmission of the first signal and the second signal, said timing circuit electrically connected to said function generating circuit and said frequency doubler circuit for receiving the first signal and the second signal to limit the transmission to a predetermined period;

a radio frequency antenna electrically connected to said timing circuit for transmitting said first and second signals into broadcast channels; and an electrical power supply for providing power to said radio beacon.

8. A radio beacon as recited in claim 7, wherein said function generating circuit comprises:

a crystal oscillator for generating the first signal with substantially sinusoidal oscillation; and an amplifier electrically connected to said crystal oscillator for amplifying the first signal generated by said crystal oscillator.

9. A radio beacon as recited in claim 7, wherein said frequency doubler circuit comprises:

a push-push amplifier including two active transistor devices each having a base terminal connected to RF ground and each having a collector terminal electrically connected together, said two active transistor devices each having an emitter terminal electrically joined together by a first capacitor having a predetermined capacitance, said push-push amplifier being electrically connected to said function generating circuit.

10. A radio beacon as recited in claim 9, wherein said tank circuit comprises a circuit having low reactance, said tank circuit being electrically coupled to said emitter terminals.

11. A radio beacon as recited in claim 10, wherein said tank circuit comprises:

a first inductor having a predetermined inductance electrically joining the emitter terminal of one said active transistor device to ground; and a second inductor having a predetermined inductance electrically joining the emitter terminal of the second said active transistor device to ground.

12. A radio beacon as recited in claim 8, wherein said electrical power supply comprises a lithium anode C-cell battery pack that produces substantially six D.C. volts.

13. A radio beacon as recited in claim 12, wherein said radio beacon further comprises a switch electrically connected to said electrical power supply for connecting said power supply to said circuit means.

14. A radio beacon as recited in claim 13, wherein said radio beacon further comprises a splitter circuit electrically connected to said function generating circuit, said frequency doubler circuit and said timing circuit for feeding the first signal from said function generating circuit into said frequency doubler circuit on one leg and for bypassing said first signal past said frequency doubler circuit into said timing circuit on another leg.

* * * * *